Dec. 6, 1932.   P. A. FAVRE   1,889,891
METHOD AND APPARATUS FOR MAKING GLASS TUBING AND RODS
Filed March 27, 1930
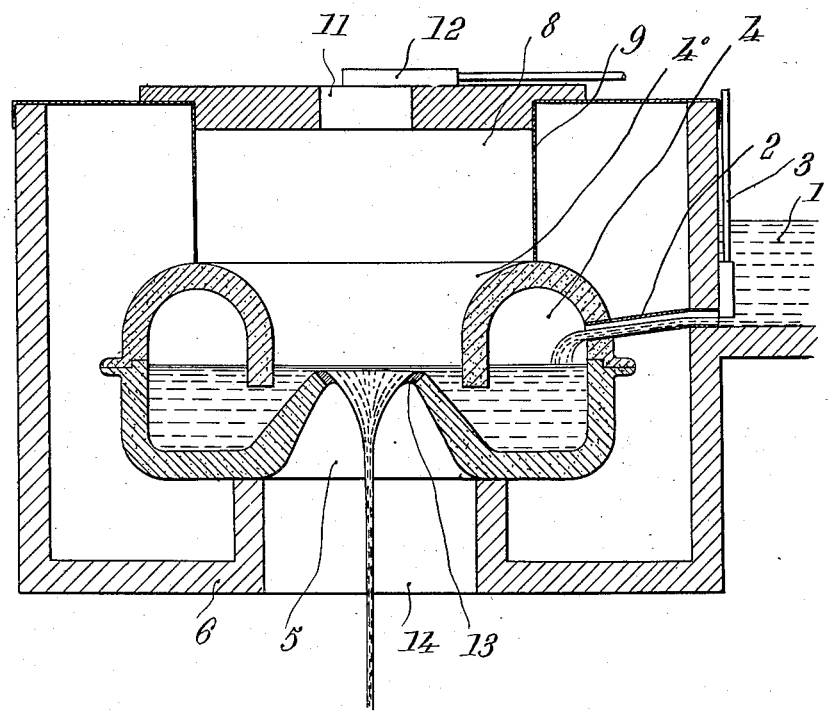
INVENTOR
PIERRE ANDRÉ FAVRE,
ATTORNEY Patented Dec. 6, 1932

1,889,891

UNITED STATES PATENT OFFICE

PIERRE ANDRÉ FAVRE, OF CROSNE, FRANCE

METHOD AND APPARATUS FOR MAKING GLASS TUBING AND RODS

Application filed March 27, 1930, Serial No. 439,446, and in Austria November 6, 1929.

The present invention relates to a method and apparatus for making glass tubing and rods.

One of the objects of the invention is to provide a novel method and apparatus for making glass tubing and rods without using a mandrel of any kind.

Other objects will appear in the course of the detailed description now to be given with reference to the accompanying drawing, in which the single figure represents one illustrative embodiment of the invention in vertical section.

Referring to the drawing, there is shown a glass reservoir 1,—a conduit 2, controlled by valve 3,—an annular chamber 4 provided with an overturned skimming edge $4^1$ and an annular or polygonal overflow 5 of conical section,—a furnace chamber 6 provided with oil, gas, coal or electrical heating means (not shown) of conventional design,—a top closure 8 covering a passage 9 and having an air inlet 11 formed therein controllable by valve 12,—and a horizontal, metallic overflow 13 terminating in an overturned edge.

When the glass in reservoir 1 is to be drawn into tubing and rods, valve 3 is displaced in accordance with the rate of overflow desired over metallic overturned edge 13, the temperature of chamber 6 and of bath 4 is regulated to obtain the desired glass plasticity, and valve 12 is opened to admit air in quantities, and at the rate of cooling, desired. The hollow glass cone, overflowing at 13, descends via passage 14 and, by its own weight, draws the cooled glass into tubing, air being drawn via opening 11 into the hollow tube axis.

Edge 4° prevents impurities from accompanying the glass being drawn and the overflow at 13 is strictly proportional to the opening of valve 3.

Obviously edge 13 should be of sufficient diameter to insure the formation of a curvilinear, hollow, conical overflow sheet.

What I claim is:—

1. In a tube making apparatus, a chamber adapted to receive molten glass, said chamber having a peripherally unobstructed orifice formed therein lying in a substantially horizontal plane and above the level of the bottom thereof, a glass furnace adapted to supply glass to said chamber, a conduit extending between said furnace and said chamber, and means for controlling the rate of flow of glass through said conduit.

2. In a tube making apparatus, a chamber adapted to receive molten glass, said chamber having a polygonal peripherally unobstructed overflow orifice having a vertical axis formed therein, and a skimming wall extending downward into said chamber adjacent said overflow orifice and below the level of said overflow orifice.

3. Apparatus for forming glass tubes comprising a chamber for holding molten glass, said chamber having a peripherally unobstructed circular overflow opening therein above the bottom thereof lying in a horizontal plane, means for supplying glass to said chamber to overflow the edges of said opening, and means for admitting air above said orifices.

4. The method of forming glass tubes which consists in causing molten glass from the upper surface of a bath to flow in a thin sheet over the edge of a circular orifice within the bath having a vertical axis and admitting air above said orifice.

5. Apparatus for forming glass tubes comprising a chamber adapted to receive molten glass, the bottom of said chamber having an upward frustroconical projection therein and an orifice in the upper plane surface of said frustroconical projection, the under side of said projection being hollow, whereby the inner walls thereof slope away from said orifice.

In testimony whereof I affix my signature.

PIERRE ANDRÉ FAVRE.